Figure 1:
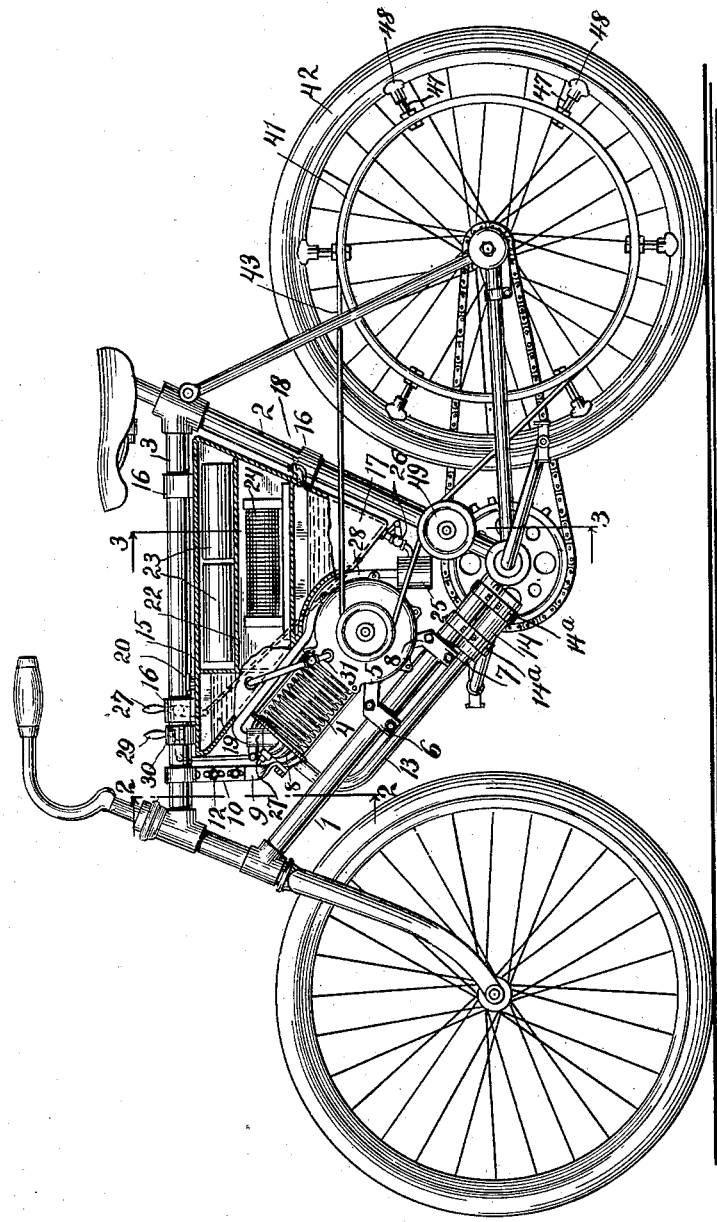

No. 686,284. Patented Nov. 12, 1901.
E. F. GOTTSCHALK.
By judicial change of name now E. F. STRATTON.
MOTOR CYCLE.
(Application filed Feb. 18, 1901.)

(No Model.) 2 Sheets—Sheet 1.

WITNESSES:
John O. Gempler
John A. Clark

INVENTOR
Edmond F. Gottschalk
BY
Kenyon & Kenyon,
ATTORNEYS

No. 686,284. Patented Nov. 12, 1901.
E. F. GOTTSCHALK.
By judicial change of name now E. F. STRATTON.
MOTOR CYCLE.
(Application filed Feb. 18, 1901.)
(No Model.) 2 Sheets—Sheet 2.
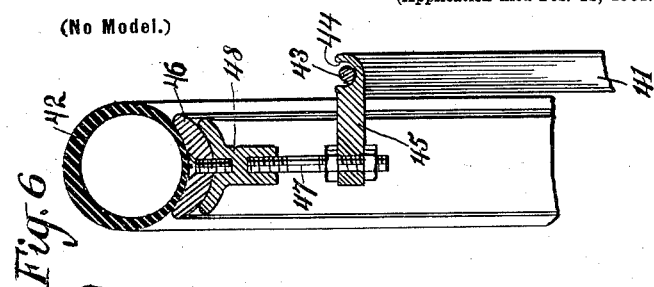
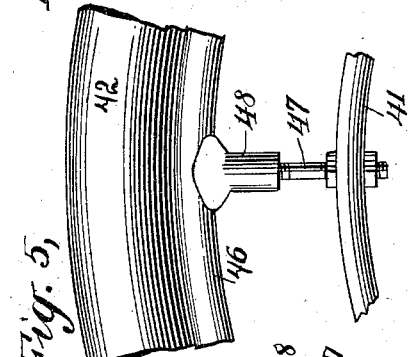
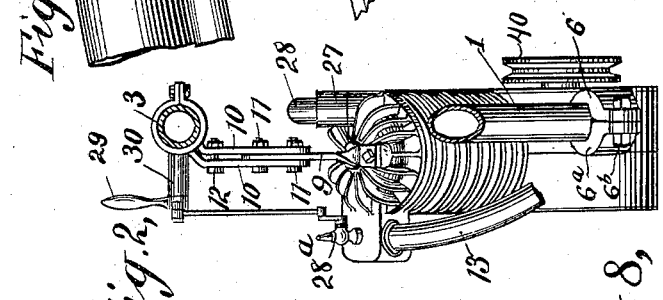
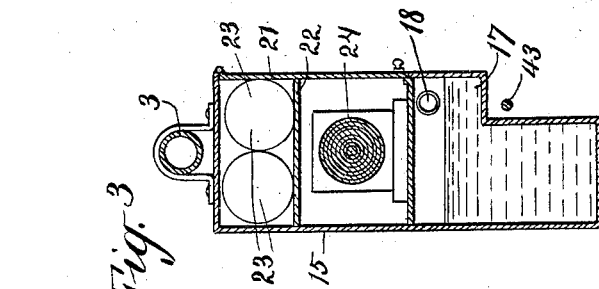
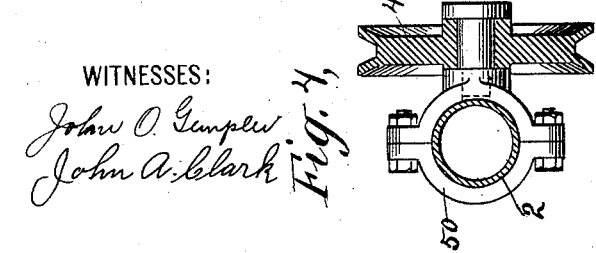
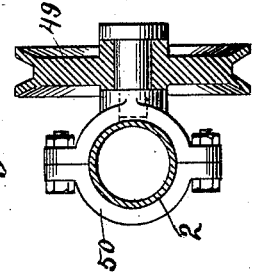
WITNESSES:
John O. Gumpler
John A. Clark
INVENTOR
Edmond F. Gottschalk
BY
Kenyon & Kenyon
ATTORNEYS.
THE NORRIS PETERS CO., PHOTO-LITHO., WASHINGTON, D. C.

UNITED STATES PATENT OFFICE.

EDMOND F. GOTTSCHALK, (BY JUDICIAL CHANGE OF NAME NOW EDMOND FRANCIS STRATTON,) OF NEW YORK, N. Y.

MOTOR-CYCLE.

SPECIFICATION forming part of Letters Patent No. 686,284, dated November 12, 1901.

Application filed February 18, 1901. Serial No. 47,726. (No model.)

*To all whom it may concern:*

Be it known that I, EDMOND F. GOTTSCHALK, a citizen of the United States, and a resident of the city, county, and State of New York, have invented certain new and useful Improvements in Motor-Cycles, of which the following is a specification.

My invention relates to motor-cycles, and more particularly to a motor equipment for bicycles.

The object of my invention is to provide a motor equipment which may be attached to diamond-frame bicycles of ordinary construction without requiring any alterations therein. Other objects of my invention are to make the equipment in general as light and compact and simple as possible and to so mount it upon the bicycle that it will not interfere with the operation or control thereof or with the comfort or convenience of the rider; also, to provide a construction which may be readily attached to the various makes and sizes of bicycles.

These and other objects of my invention will be more fully set forth in the following description.

My invention consists in the novel parts, improvements, and combinations herein shown and described.

The accompanying drawings, which are referred to herein and form a part hereof, illustrate one embodiment of my invention and serve, in connection with the description herein, to explain the principles thereof and the best mode in which I have contemplated applying those principles.

Figure 1 is a side elevation, partly in section, of a diamond-frame bicycle of ordinary construction equipped with a motor and motor adjuncts constructed in accordance with my invention. Fig. 2 is a transverse section taken on the line 2 2, Fig. 1, the motor being shown in elevation as seen from the direction of the arrows. Fig. 3 is a transverse section on the line 3 3, Fig. 1. Fig. 4 is a sectional detail view taken on the line 4 4, Fig. 3. Figs. 5 and 6 are respectively a side elevation and a section illustrating a detail. Fig. 7 is a diagrammatic view illustrating the electrical connections of the igniting devices; and Fig. 8 is a sectional detail view taken on the line 8 8, Fig. 1.

Like reference-numerals refer to like parts wherever they occur throughout the several views.

Referring now to the drawings in detail, and more particularly at first to Fig. 1, the reference-numerals 1, 2, and 3 represent the lower forward, the upright, and the top braces, respectively, of the frame of the bicycle. The motor 4 may be of any suitable construction; but I preferably use a gasolene-motor of the well-known de Dion type. As shown, the motor 4 is provided at its base portion 5 with a pair of supporting-brackets 6 and 7, which are provided with clamp-sections $6^a$ and $7^a$, constructed to engage the lower forward brace 1 of the bicycle-frame, bolts $6^b$ and $7^b$ being provided to secure the sections $6^a$ and $7^a$ in place and render them adjustable for braces of different sizes. These brackets 6 and 7 are preferably made integral with the casing of the motor, as shown in Fig. 8, and are so arranged that when in position the motor will rest with its longitudinal axis substantially parallel with brace 1. In order to steady the motor and relieve the strain on the brace 1, the top or head 8 of the motor is connected to the top brace 3 of the frame by a bracket or stay 9. The stay 9 is preferably formed in two sections, the upper section being formed in two pieces 10, between the lower ends of which the lower section 9 is clamped by the bolts 11. The upper ends of the pieces 10 are constructed to engage the top brace 3 of the frame and are clamped thereon by bolt 12. The brace 9 may be made adjustable longitudinally to adapt it to frames of different sizes in any suitable way, as by slotting one or both of the sections where the bolts 11 pass through them. The exhaust-pipe 13 of the motor, together with the muffler 14, is supported in position beneath and parallel with the lower brace 1 of the frame by any suitable means, as by the metallic straps or bands $14^a$. (Shown in Fig. 1.)

The supplies for the motor are carried in a casing 15, which is preferably substantially triangular in shape and constructed to occupy the space between the motor 4 and the braces 2 and 3 of the frame, as is clearly shown in Fig. 1. This supply carrier or tender 15 may be secured in position by any suitable means, as by the metallic bands or straps 16. The supply carrier or tender 15, as shown, is divided into three general divisions, as follows: In the lower part of the casing is formed a permanently-closed receptacle 17 for the supply of gasolene or other fuel, a capped opening 18 being provided at the rear of the casing to enable the receptacle to be refilled. The upper forward end of the casing is formed into a permanently-closed receptacle 19 for the lubricating-oil for the motor, a capped opening 20 being provided to enable the supply of oil to be replenished. The remainder of the casing for the tender is made accessible by means of a hinged door 21 and, as shown, is divided into two compartments by means of a transverse partition 22. These compartments are designed to receive the battery-cells 23 and the sparking-coil 24, which form a part of the igniting devices for the motor. While two compartments for the igniting devices are shown, a single compartment will answer the purpose, and, if desired, a larger proportion of the casing may be utilized for the fuel-supply receptacle than is shown. This casing 15 should be made as narrow as it may be without too much limiting its storage capacity in order that it may not interfere with the comfort or convenience of the rider. This casing should also be centered with relation to the frame of the bicycle, so as not to interfere with the balance of the wheel. With this object in view the casing is formed with a recess in its lower part, so that one side of the casing may be located in the plane of the driving-belt, hereinafter referred to.

The supply-receptacle 17 for the fuel is connected with the carbureter 25 of the motor by means of a pipe 26, which is provided with a regulating-valve operatively connected with the controlling-lever 27, which is suitably mounted upon the top brace 3 of the frame within easy reach of the rider. The mixture of air and vapor is conveyed from the carbureter 25 to the admission-valve 27 of the motor by means of a pipe 28. The admission-valve 27 is preferably arranged at such an angle to the longitudinal axis of the motor that when the motor is secured in place, as shown in Fig. 1, the valve will occupy a substantially vertical position. By this construction the motor is enabled to operate as perfectly in an inclined position as in a vertical position. The relief-cock 28ª of the motor is operatively connected with the controlling-lever 29, which is mounted by means of a bracket 30 on brace 3 of the frame within easy reach of the rider.

The supply of lubricating-oil in the receptacle 19 is connected with the motor by a valved pipe 31, by means of which the supply of lubricating-oil may be accurately controlled.

In Fig. 7 the electrical connections of the igniting devices of the motor are diagrammatically illustrated. The circuit-breaker 32 of the motor is located in the primary circuit 33, which circuit also includes the batteries 23 and a switch 34, which may be suitably located within convenient reach of the operator, as in one of the grips of the handlebars. The secondary circuit 35 of the coil 24 is connected to the sparking-terminals 36, which are mounted in the explosion-chamber of the motor in the usual manner. Any other suitable arrangement of the circuit may be used, or the single-circuit sparking system may be resorted to, if desired. The details of the wiring of the igniting devices are not shown, as they may be carried out in numerous ways which will readily suggest themselves to those skilled in the construction of motors of this type.

As shown in the drawings, the motor is provided with a small driving-wheel 40, which is connected with a larger driving-wheel 41, carried by the rear wheel 42 of the bicycle, by means of a belt 43. The wheel 41 is so constructed that it may be secured to bicycle-wheels of varying sizes, and this construction I regard as an important feature of my invention. As shown, the wheel comprises a rim having on its outer circumference a groove 44, adapted to receive the belt 43, and a series of laterally-projecting arms or lugs 45, by means of which it is secured to the rim or felly of the bicycle-wheel. The lugs 45 are provided with radial perforations which relieve the inner threaded ends of the arms 47, said arms being adjustably secured to the lugs 45 by the nuts, as shown. The arms 47 are provided at their outer extremities with headpieces 48, which are made to conform on their outer surfaces to the shape of the rim or felly 46 of the bicycle-wheel 42. The wheel 41 may be fitted to rims 46 of different internal diameters by adjusting the arms 47 with relation to the lugs 45 inwardly or outwardly more or less, as may be required, and the wheel 41 may also be centered with relation to the wheel of the bicycle in like manner. When the wheel 41 is properly adjusted, the headpieces 48 are rigidly secured to the rim 46 by any suitable means, as by the screw shown. For the purpose of adjusting the tension of the belt 43 the small idler-wheel 49 is provided, the same being mounted upon a bracket 50, which is adjustably clamped on the upright brace 2 of the frame below and entirely out of the way of the supply carrier or tender. Instead of belt 43 a sprocket-chain may be used, the wheels 40, 41, and 49 being in that case provided with sprocket-teeth in place of the grooves shown.

The operation of the apparatus will be fully understood from the foregoing description, and a further detailed description of the same will therefore be unnecessary.

It will be seen that the equipment shown is simple and compact in construction and that by reason of the various adjustments it may be readily applied to any diamond-frame bicycle and is therefore capable of a very general and extensive use. It is also an advantage of my invention that all parts of the power-generator are brought within the limits of the three main braces of the bicycle-frame and are so arranged and centered as not to seriously interfere with the balance or control of the machine.

My invention is not limited to the particular construction shown and described nor to the particular construction by which it may be carried into effect, as many changes may be made therein without departing from the principles of my invention or sacrificing the chief advantages thereof.

Having thus described my invention, what I claim, and desire to secure by Letters Patent, is—

1. The combination with a gasolene or similar motor having a closed casing forming the base of the motor, of supporting devices therefor constructed to secure the motor in operative position upon a diamond-frame bicycle of ordinary construction, said supporting devices comprising one or more clamp-brackets made integral with the base of the motor and adapted to engage the lower forward brace of the bicycle-frame, and an adjustable bracket or stay secured to the top of the motor and adapted to engage the top brace of the bicycle-frame, substantially as described.

2. The combination with a gasolene or similar motor for motor-vehicles having an admission-valve for the explosive mixture arranged at an angle to the longitudinal axis of the motor, of supporting devices constructed to secure the motor in operative position upon a diamond-frame bicycle with the admission-valve in a substantially vertical position, substantially as described.

3. The combination with a gasolene or similar motor for motor-vehicles, of supporting devices constructed to secure the motor upon a diamond-frame bicycle with the longitudinal axis of the motor arranged substantially parallel with the lower forward brace of the bicycle-frame, and a supply carrier or tender for the motor comprising a unitary casing having a receptacle for the fuel-supply and an accessible compartment for igniting devices of the motor, said casing being constructed to be secured in the space between the motor and the top and upright braces of the bicycle-frame, substantially as described.

4. The combination with a gasolene or similar motor for motor-vehicles, of supporting devices constructed to secure the motor upon a diamond-frame bicycle with the longitudinal axis of the motor arranged substantially parallel with the lower forward brace of the bicycle-frame, and a supply carrier or tender for the motor comprising a unitary casing having receptacles for the fuel and for the lubricating-oil for the motor, connections between the said receptacles and the motor and an accessible compartment for the igniting devices of the motor, substantially as described.

5. A supply carrier or tender for motor-bicycles comprising a unitary casing having an accessible compartment for the igniting devices of the motor and a permanently-closed receptacle for the fuel-supply, substantially as described.

6. A supply carrier or tender for motor-bicycles comprising a unitary casing and an accessible compartment for the igniting devices of the motor and permanently-closed receptacles for the fuel-supply and a supply of lubricating-oil for the motor, substantially as described.

7. A supply carrier or tender for motor-bicycles comprising a unitary casing having an accessible compartment for the igniting devices of the motor and a receptacle for the fuel-supply, said casing being substantially triangular in shape and adapted to be secured in the angle between the top and upright braces of the frame of a diamond-frame bicycle, substantially as described.

8. In a motor-bicycle the combination with a motor having a small driving-wheel, of adjustable supporting devices constructed to secure the motor in operative position upon the frame of the bicycle, a larger driving-wheel adjustably secured to the rear wheel of the bicycle, a chain or belt mounted on said driving-wheels, and an idler-wheel adjustably mounted on the frame of the bicycle for varying the tension of the chain or belt, substantially as described.

9. In a motor-bicycle the combination with a motor having a small driving-wheel, of adjustable supporting devices constructed to secure the motor upon a diamond-frame bicycle with the longitudinal axis of the motor arranged substantially parallel with the lower forward brace of the bicycle-frame, a supply carrier or tender for the motor constructed to be secured in the space between the motor and the top and upright braces of the bicycle-frame, a larger driving-wheel adjustably secured to the rear wheel of the bicycle, a chain or belt mounted on said driving-wheels, and an idler-wheel adjustably mounted on the upright brace of the frame of the bicycle for varying the tension of the chain or belt, substantially as described.

In testimony whereof I have signed my name to this specification in the presence of two subscribing witnesses.

EDMOND F. GOTTSCHALK.

Witnesses:
EDWIN SEGER,
JOHN O. GEMPLER.